Patented Aug. 3, 1943

2,325,981

UNITED STATES PATENT OFFICE 2,325,981

SYNTHETIC RUBBER COMPOSITION

Donald V. Sarbach, Cuyahoga Falls, Ohio, assignor to The B. F. Goodrich Company, New York, N. Y., a corporation of New York No Drawing. Application August 26, 1941,
Serial No. 408,349

5 Claims. (Cl. 260—42)

This invention relates to synthetic rubber composition and particularly to compositions containing an emulsion copolymer of butadiene and acrylonitrile.

The processing of synthetic rubber has in general presented many problems not encountered in the processing of natural rubber due to different behavior on roll mills, differences in plasticity and tackiness, incompatibility of synthetic rubber with certain softening or plasticizing agents commonly employed in natural rubber and other differences in properties. Processing difficulties have been particularly pronounced in the case of oil-resisting synthetic rubber prepared by the emulsion copolymerization of butadiene and acrylonitrile. This type of synthetic rubber ordinarily lacks plasticity and tackiness and is difficult to process satisfactorily until it is first mixed with softeners. Although certain materials which are compatible with this type synthetic rubber are known, these softeners ordinarily do not impart tackiness to the composition and, moreover, the presence of such softeners often deleteriously affects the properties of vulcanizates prepared from compositions containing them. The problem is further complicated by the fact that softeners for copolymers prepared by copolymerizing butadiene and acrylonitrile in one ratio are often not satisfactory materials for use with copolymers of a different composition. Thus the 55:45 emulsion copolymer of butadiene and acrylonitrile, by which is meant the synthetic rubber prepared by copolymerizing in aqueous emulsion about 55 parts by weight of butadiene and about 45 parts by weight of acrylonitrile, is not satisfactorily softened by some of the most useful softeners for emulsion copolymers prepared from 25 parts of acrylonitrile and 75 parts of butadiene.

I have now discovered that resins prepared from cashew nut shell oil, which is the oil found in the shell surrounding the kernel of the cashew nut, are excellent softeners for the 55:45 emulsion copolymers of butadiene-1,3 and acrylonitrile. These materials impart to this synthetic rubber certain desirable properties which do not accompany the use of softeners in general and which are not even obtained when these resins are incorporated in natural rubber or in other synthetic rubbers. For example synthetic rubber compositions comprising a 55:45 emulsion copolymer of butadiene and acrylonitrile and a cashew nut shell oil resin are processed in substantially the same easy manner as are natural rubber compositions; they are tacky and may be adhered to each other or to other rubbery materials and they may be vulcanized to yield extremely valuable vulcanizates.

The resins from cashew nut shell oil which are employed in this invention include the various polymerized cashew nut shell oil resins as well as the condensation products prepared by treating cashew nut shell oil or materials derived therefrom with an aldehyde such as formaldehyde, acetaldehyde, furfuraldehyde, benzaldehyde or the like, with a reactive methylene containing agent such as hexamethylene tetramine, with a polyhydric alcohol such as glycerine, with a phenol, or with some other material which reacts or condenses with cashew nut shell oil to form a resinous product. Cashew nut shell oil as it occurs in the natural form is known to consist principally of anacardic acid and cardol both of which are phenols having an unsaturated side chain, anacardic acid having the empirical formula $C_{21}H_{32}O_3$ and cardol having the empirical formula $C_{32}H_{52}O_4$. When anacardic acid is distilled at reduced pressure the carboxylic acid group is removed and another phenol having an unsaturated side chain and known under the trade-mark name as "Cardanol" is obtained. All three of these materials, obtained or derived from cashew nut shell oil, may be polymerized as by the addition of heat or sulfuric acid or condensed with the aldehyde, etc., mentioned above to form resinous materials and it is such resinous materials which are employed in this invention. Many of such resins are sold commercially under the trade names "Cardolite" and "Cardosol." Resins obtained by polymerizing cashew nut shell oil such as the commercial products "Cardolite 816," "Cardolite 869," "Cardolite 707" and "Cardolite 708" when incorporated with 55:45 emulsion copolymers of butadiene and acrylonitrile produce especially valuable synthetic rubber compositions, hence these resins are preferred in this invention.

As a specific example of this invention a synthetic rubber composition is prepared by incorporating on a roll mill 50 parts by weight of a polymerized cashew nut shell oil resin known commercially as "Cardolite 816" in 100 parts by weight of a synthetic rubber prepared by copolymerizing in aqueous emulsion 55 parts by weight of butadiene and 45 parts by weight of acrylonitrile. The softener mixes readily with the synthetic rubber and a smooth, plastic, tacky gum containing all the softener is produced after a total milling time of only six minutes. The composition containing the softener may be milled easily over a wide range, takes up compounding and vulcanizing ingredients quite readily and may otherwise be processed in substantially the same manner as natural rubber compositions. The great improvement in processing properties brought about by the addition of the polymerized cashew nut shell oil is remarkable since the stock retains much of its resiliency and nerve while most softeners which improve processing materially lessen the nerve of the compound.

The above composition possesses excellent building tack, and may be even further tackified by being brushed with a volatile organic solvent such as ethyl acetate, acetone, methyl ethyl ketone or the like. Compounds prepared from this composition containing polymerized cashew nut shell oil also possesses another important property in that they may be adhered through the use of tie-plies to natural rubber compounds in the manner described in my copending application Serial Number 384,142, filed March 19, 1941. Compounds prepared using many other softeners do not possess this property.

When the above composition containing a 55:45 emulsion copolymer of butadiene and acrylonitrile and polymerized cashew nut shell oil is mixed with compounding and vulcanizing ingredients and then cured, excellent vulcanizates are obtained. Soft rubber vulcanizates having good tensile strength and elongation, high durometer hardness and excellent oil and solvent resistance are produced when the composition is compounded and vulcanized in the customary manner. Hard rubber or synthetic ebonite vulcanizates may also be obtained from such compositions when they are cured with sulfur and accelerated with a basic material such hexamethylene tetramine. Such vulcanizates are very resistant to oils and chemicals, are insoluble in chlorinated hydrocarbons and lacquer solvents and are even resistant to the action of acids and alkalies. They may, accordingly, be used in the manufacture of tank linings, and in similar applications where a high resistance to chemical attack is desired.

Cements prepared from stocks containing a 55:45 emulsion copolymer of butadiene and acrylonitrile and cashew nut shell oil resins are also especially useful because of their tackiness and their ability to be cured to an oil and solvent resistant bond.

Although the invention has been illustrated by means of the above specific example it is to be understood that many variations and modifications may be made therein. Thus many other resins prepared from cashew nut shell oil may be incorporated with 55:45 emulsion copolymers of butadiene and acrylonitrile to yield valuable synthetic rubber compositions. Such resins are compatible with such copolymers in a wide range of proportions and any desired proportion of resin may be incorporated in the copolymer. Equal parts of resin and copolymer may be employed, if desired, or as little as 1 part of the resin for 100 parts of the copolymer may be used, but in ordinary commercial operations about 10-50 parts of the softener for each 100 parts of the copolymer are employed.

The cashew nut shell oil resin softeners may be incorporated in the copolymer by any desired method as by adding the softener while the rubber is being worked on a roll mill, masticating the mixture of rubber and softener in an internal mixer or adding the softener to a solution or dispersion of the synthetic rubber.

This invention is limited to the use of cashew nut shell oil resins with copolymers of butadiene-1,3 and acrylonitrile in a ratio of about 55:45. Although slight variations in proportions such as the use of as much as 60 or as little as 50 parts of butadiene in the preparation of the copolymer are within the scope of the invention, the best results are obtained when the copolymer described in the specific example is employed. The proportions throughout the specification and claims are by weight.

Other materials such as natural rubber, other softeners, pigments, fillers, vulcanizing agents, accelerators, antioxidants and the like may be included in the compositions herein described. Other modifications which will be apparent to those skilled in the art are within the spirit and scope of the invention as defined in the appended claims.

I claim:

1. A composition of matter comprising a resin prepared from cashew nut shell oil and a copolymer prepared by copolymerizing in aqueous emulsion about 55 parts of butadiene-1,3 and about 45 parts of acrylonitrile.

2. A composition of matter comprising polymerized cashew nut shell oil and a 55:45 emulsion copolymer of butadiene-1,3 and acrylonitrile.

3. Vulcanized synthetic rubber obtained by vulcanizing in the presence of a resin prepared from cashew nut shell oil a copolymer prepared by copolymerizing in aqueous emulsion about 55 parts of butadiene-1,3 and 45 parts of acrylonitrile.

4. A soft vulcanized synthetic rubber obtained by vulcanizing a 55:45 emulsion copolymer of butadiene-1,3 and acrylonitrile in the presence of polymerized cashew nut shell oil and sulfur.

5. A hard synthetic rubber vulcanizate obtained by vulcanizing a 55:45 emulsion copolymer of butadiene-1,3 and acrylonitrile in the presence of polymerized cashew nut shell oil, sulfur and hexamethylene tetramine.

DONALD V. SARBACH.

CERTIFICATE OF CORRECTION.

Patent No. 2,325,981.                                August 3, 1943.

DONALD V. SARBACH.

It is hereby certified that error appears in the printed specification of the above numbered patent requiring correction as follows: Page 2, first column, line 1, after "wide" insert --temperature--; line 17, for "possesses" read --possess--; line 37, after "such" insert --as--; and that the said Letters Patent should be read with this correction therein that the same may conform to the record of the case in the Patent Office.

Signed and sealed this 21st day of September, A. D. 1943.

(Seal)

Henry Van Arsdale,
Acting Commissioner of Patents.